Sept. 8, 1970     T. PACE ET AL     3,527,524

LENS FOR CONVERTING A FLAT MIRROR TO A MAGNIFYING MIRROR

Original Filed Sept. 21, 1965

INVENTOR.
THOMAS PACE
DOMINIC A. La BARBERA
BY
Hauser and Lane
ATTORNEYS.

3,527,524
LENS FOR CONVERTING A FLAT MIRROR TO A MAGNIFYING MIRROR

Thomas Pace, San Jose, and Dominic A. La Barbara, Santa Clara, Calif., assignors to John E. Johns, Campbell, Calif.
Continuation of application Ser. No. 488,890, Sept. 21, 1965. This application Apr. 17, 1969, Ser. No. 817,293
Int. Cl. G02b 17/08, 7/02
U.S. Cl. 350—202      2 Claims

ABSTRACT OF THE DISCLOSURE

Presented is a plano-convex attachment for panel type mirrors embodying a detachable suction cup that is attached to the periphery of the circular plano-convex lens in a manner to preclude the interference with the transmission of light through the lens. Additionally, the lens may be detachably secured to the mirror in a manner to permit the lens to lie contiguously against the face of the mirror, thus eliminating any space therebetween, or, in the alternative, permitting attachment of the lens in a manner to be spaced from the face of the mirror and capable of being swung from side to side to permit cleaning of both the mirror and the lens.

---

This is a continuation of application Ser. No. 488,890, filed Sept. 21, 1965, and now abandoned.

The present invention relates to mirrors, and pertains more particularly to a plastic lens whereby any panel type mirror may become a magnifying mirror.

There are frequent occasions when one desires the use of a magnifying mirror, and this is particularly true of those having poor or declining eyesight. There are available various types of small magnifying mirrors, but these are not always capable of being easily mounted in a position to take advantage of satisfactory lighting, and are easily broken. In most homes, a panel mirror is provided in each bathroom, and adequate lighting is provided for it since it is used by the men of the household for shaving, and by the women for other purposes requiring adequate illumination. Also, many women have a so-called vanity table or dresser with one or more panel mirrors and adequate lighting.

The present invention provides a plastic lens for mounting directly on any flat, panel type mirror, and having attaching means for mounting the lens on a mirror.

An object of the invention is to provide a molded plastic lens of a size suitable for use as a magnifying mirror, and means for mounting the lens parallel to, and closely adjacent the exposed, outer surface of a flat mirror upon which it is mounted.

Another object of the invention is to removably mount a transparent plastic lens adjacent a flat mirror upon which it is mounted.

Another object is to provide an improved lens for mounting on a flat mirror to adapt the latter for use as a flat mirror.

The foregoing objects and advantages of the invention will be apparent from the following description and the accompanying drawings, wherein.

Figures 1, 2:
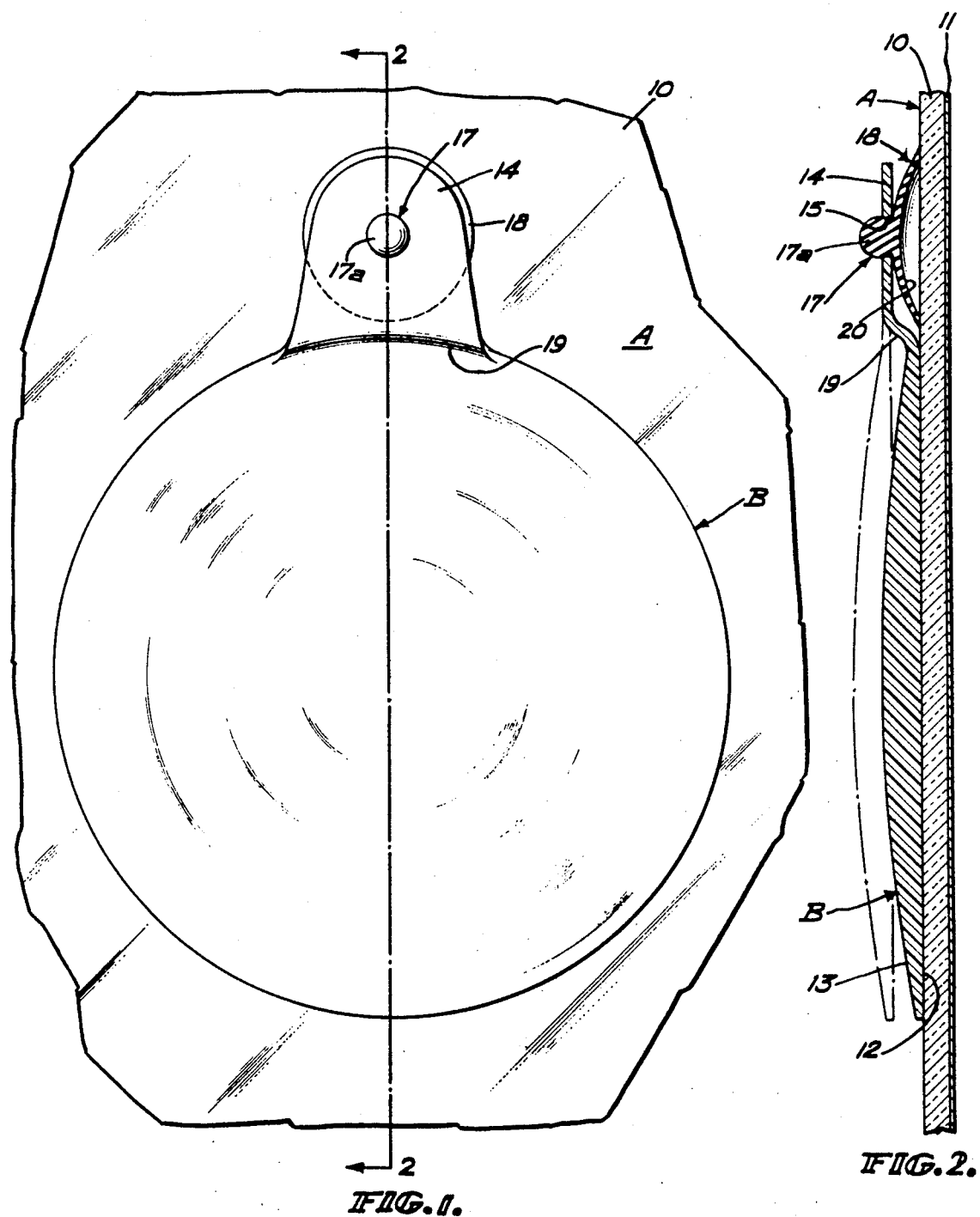
FIG. 1 is a front elevational view showing a magnifying lens embodying the invention mounted on a flat mirror.
FIG. 2 is a sectional view taken along line 2—2 of FIG. 1.

Referring to the drawings, conventional flat mirror A comprises a sheet 10 of clear, transparent smooth glass, preferably of plate glass, covered on its rear side by a reflecting layer or film 11 of mercury or other suitable reflecting material.

A lens B is of molded, transparent plastic of a material suitable for making lenses, such as, for example, a clear, transparent, acrylic or other plastic. The specific plastic material employed for the lens is not material to the invention, and several suitable materials are available through routine trade channels.

The lens B preferably is flat on the side 12 thereof which is intended to be positioned adjacent a flat mirror A with which it is to be used, and the outer side 13 is curved to provide a required degree of magnification, such as, for example, a convex curvature providing one diopter, one and one half diopters, or other degree of magnification depending upon the desire of a purchaser. The degree of curvature of the lens is not, however, a feature of the invention, and it might even have one or both surfaces concave if a user should desire a reducing effect.

A mounting tab 14 is provided on one side of the lens B, with a hole 15 (FIG. 2) therein, into which is forcibly inserted a headed stud 17 provided on the rear of a conventional vacuum cup 18. The shank portion of the stud 17 is of a size to fit freely into the hole 15, but the head 17a thereof is of a size to require either a slight compression of the head 17a, or a slight enlargement of the hole 15 in order to admit it. For this reason, either the material of the tab surrounding the hole 15, or that of the head 17a is sufficiently elastic to permit this insertion.

As illustrated, the tab 14 is formed with an offset 19 therein, and this structure is preferred, since it positions the inner surface 12 of the lens B closer to a mirror A upon which the lens B is mounted than would be the case if no offset were provided. The lens B is, however, capable of its intended use in accordance with the present invention if the tab 14 is straight as indicated in broken lines in FIG. 2.

In using the invention, with the headed stud 17 on the vacuum cup 18 inserted in the hole 15 in the lens tab 14, the concave face 20 of the vacuum cup 18, preferably is premoistened to insure proper adhesion. Then, with the lens B in a desired location on the face of a selected flat mirror A, and with the tab 14 uppermost, the vacuum cup 18 is pressed against the mirror to expel the air from the space between the concave face 20 of the vacuum cup and the mirror A. The invention is then ready for use and the area of the mirror A covered by the lens B becomes, in effect, either a magnifying or reducing mirror depending upon the curvature of the lens.

The invention thus makes a magnifying mirror of any desired portion of any flat mirror. It is inexpensive, light, easily attached and detached, and can be readily packed for traveling. Furthermore, it is not easily broken, even if dropped.

While I have illustrated and described a preferred embodiment of the present invention, it will be understood however, that various changes and modifications may be made in the details thereof without departing from the scope of the invention as set forth in the appended claims.

We claim:
1. In the combination of a mirror having a planoparallel glass plate having one surface coated with an opaque metallic reflecting film, a magnifying lens and means for detachably securing said lens to said mirror on the surface of the glass plate opposite said coated surface, the improvement comprising said lens being a plano-convex lens molded to have a circular periphery from a synthetic transparent plastic material and having a substantially flat suspension tab molded integrally therewith to project radially outward beyond the circular periphery of the lens, said tab being parallel to but laterally offset from the plane surface of the lens to- ward the convex surface of the lens, so as not to interfere with the passage of light through the lens, said tab having a circular aperture, the center of said aperture being radially outward from the center of the lens, and wherein said means for detachably securing said lens to said mirror consists of a unitary suction cup having a beaded stud integral therewith, said beaded stud having a circular cross-section shank portion of a diameter substantially equal to said circular aperture in said tab and a hear portion having a cross-section slightly larger than said aperture, said beaded stud being press-fitted into said circular aperture so that said plane surface of said lens is normally retained parallel to said plane surfaces of said glass plate while permitting relative transverse movement in relation thereto.

2. In the combination of a mirror having a plano-parallel glass plate having one surface coated with an opague metallic reflecting film, a magnifying lens and means for detachably securing said lens to said mirror on the surface of the glass plate opposite said coated surface, the improvement comprising said lens being molded from a synthetic transparent plastic material to have a circular periphery and having a circumferentially extending suspension flange molded integrally therewith to project radially outward beyond the circular periphery of the lens and including a portion laterally offset from a surface of the lens, so as not to interfere with the passage of light through the lens, and wherein said means for detachably securing said lens to said mirror consisting of a unitary suction cup having an integral mounting portion extending therefrom, said mounting portion being adapted to detachably engage said suspension flange so that said lens is normally retained parallel to said plane surface of said glass plate.

References Cited

UNITED STATES PATENTS 1,808,208   6/1931   David.

FOREIGN PATENTS 1,033,523   4/1953   France.

DAVID SCHONBERG, Primary Examiner

R. J. STERN, Assistant Examiner

U.S. Cl. X.R.

350—251